MALLARD & BAKER.
Cotton Gin.
No. 15,138.  Patented June 17, 1856.
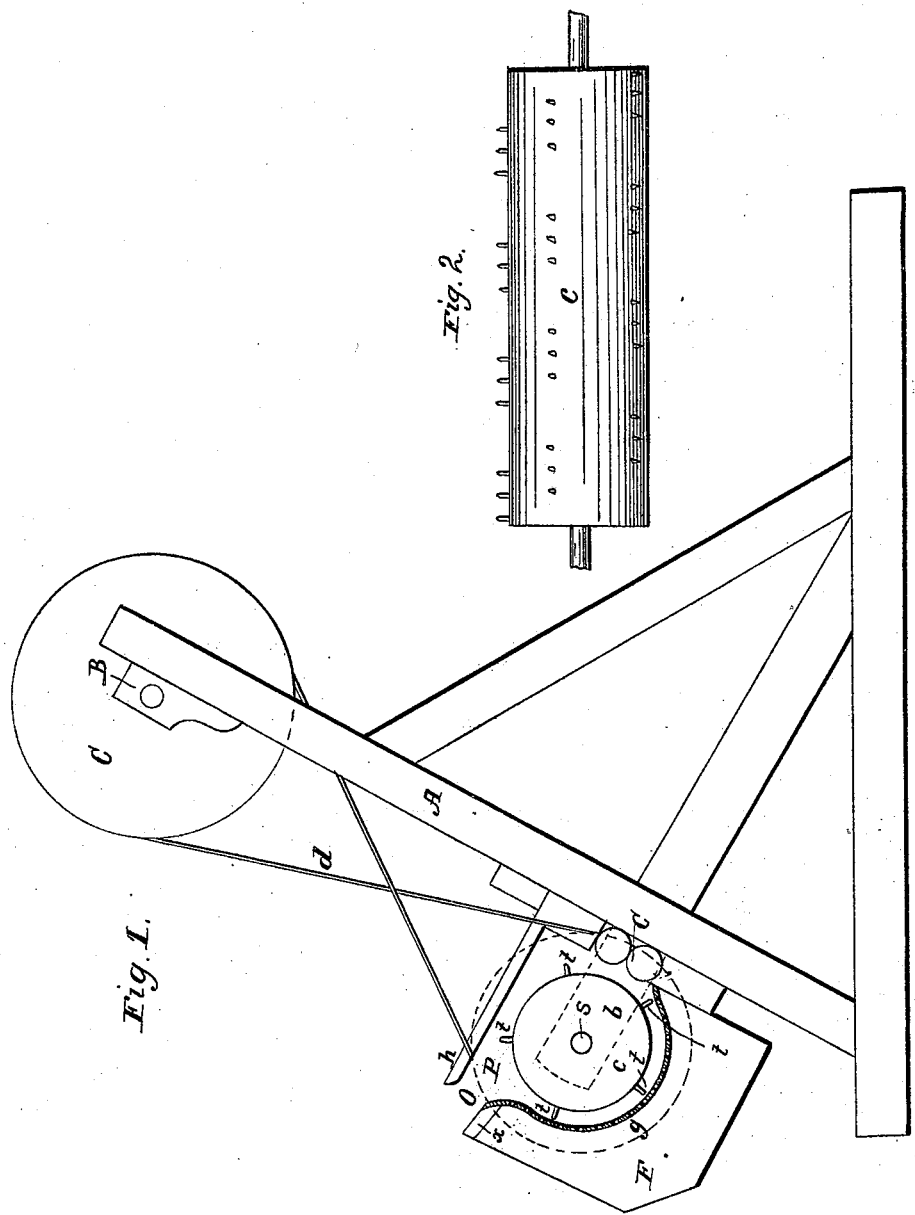

UNITED STATES PATENT OFFICE.

L. JOHN MALLARD AND WM. S. BAKER, OF RICEBOROUGH, GEORGIA.

IMPROVEMENT IN FEEDERS FOR ROLLER COTTON-GINS.

Specification forming part of Letters Patent No. 15,138, dated June 17, 1856.

*To all whom it may concern:*

Be it known that we, L. JOHN MALLARD and WILLM. S. BAKER, of Riceborough, in the county of Liberty and State of Georgia, have invented certain new and useful Improvements in Feeders for Sea-Island-Cotton Gins; and we hereby declare that the following is a full, clear, and exact description thereof, reference being had to the accompanying drawings, making a part of this specification, and to the letters of reference thereon, which indicate the same parts in the different figures wherever they occur.

Figure 1 represents an end elevation of a sea-island-cotton gin with our improvement attached thereto, and Fig. 2 a front view of the toothed cylinder.

We construct a frame in any convenient form to sustain the ginning-rollers G and feeding apparatus F. The frame A also affords bearings for the shaft B, which carries thereon the pulley C. The shaft B receives a rotary motion from the power employed.

The feeding apparatus is constructed and arranged as follows, viz: The shaft $s$ of a revolving cylinder, $c$, has its bearing in $b$ and in a corresponding piece. (Not shown in the drawings.) The same shaft also carries a pulley, P, keyed thereon, and receives its motion from the shaft B through the band $d$, passing over the pulleys C and P. The cylinder $c$ is armed with teeth $t$, placed in rows at suitable distances, of such a length as just to run clear of the ginning-rollers G when the cylinder is in motion. The teeth $t$ may be arranged spirally round the cylinder or with gaps in the rows opposite to which the teeth of the succeeding row are placed, the object being to prevent accumulations of cotton in any one place, and consequent shocks and strain upon the machine. The cylinder $c$ is inclosed in a box or casing, one portion of which, $g$, is concentric with the cylinder, and is composed of longitudinal slats with intervals between; or it may be made of wire-gauze, or of what is called "rice-wire," the purpose being to retain the cotton and allow the seeds, &c., to fall through. The grating $g$ extends from the cross-piece $x$ to the rollers G. A top piece or cover, $h$, is placed over the cylinder and completes its inclosure, excepting at the opening O, which is left to admit the unginned cotton. One end of the cylinder-casing is removed to show the interior. The shaft B also serves to communicate motion to the ginning-rollers G by pulleys and bands. (Not shown in the drawings.)

In operation the cotton is received at the opening $o$ and drawn in by the teeth $t$, which, by the rapid rotary motion of the cylinder $c$, open, clean, and free the cotton from loose and broken seeds and impurities, which fall through the screen $g$. The gin-rollers G seize the fibers and strip them from the seeds, which fall back through the screen, any excessive accumulation of cotton between the rollers being prevented by the action of the teeth, which drag the surplus away from the rollers and carry it round between the cylinder and its open casing or screen, thus equalizing the quantity as it is carried through the gin, and preventing the heating of the rollers and clogging and consequent jerking of the machinery.

We do not claim any of the parts of the above-described machine separately considered; but

What we claim as our invention, and desire to secure by Letters Patent, is—

The combination of the screen $g$ with the revolving toothed cylinder $c$, constructed in the manner described, and when so placed in relation to the ginning-rollers G that any excessive accumulation of cotton between them shall be removed or prevented and the excess be retained between the cylinder and screen until its quantity shall be equalized and relieved by the gin.

In testimony whereof we have signed our names to this specification before two subscribing witnesses.

L. JOHN MALLARD.
WM. S. BAKER.

Witnesses:
CHAS. EVERETT,
JOHN S. HOLLINGSHEAD.